United States Patent [19]

Konno et al.

[11] Patent Number: 5,607,764
[45] Date of Patent: Mar. 4, 1997

[54] OPTICAL DIFFUSER

[75] Inventors: Takeshi Konno; Takeji Ochiai, both of Shizuoka, Japan

[73] Assignee: Fuji Photo Film Co., Ltd., Kanagawa, Japan

[21] Appl. No.: 549,528

[22] Filed: Oct. 27, 1995

[30] Foreign Application Priority Data

Oct. 27, 1994 [JP] Japan .................................. 6-287423

[51] Int. Cl.$^6$ ....................................................... G02F 1/13
[52] U.S. Cl. ................................ 428/327; 428/1; 359/49; 359/69
[58] Field of Search .......................... 359/69, 49; 428/1, 428/327

Primary Examiner—Alexander Thomas
Attorney, Agent, or Firm—Sughrue, Mion, Zinn, Macpeak & Seas

[57] ABSTRACT

An improved optical diffuser comprising a transparent support and an optical diffusing layer which is coated on one surface of the support and comprises an organic polymer binder and organic polymer particles is obtained by selecting the constituents to satisfy the conditions that a difference of refractive index between the binder and particles is not more than 0.05; the polymer particles have a mean particle size of 10 to 21 μm; a weight ratio of the particles to the binder in the diffusing layer is within 1.9 to 2.6; a total weight of the coated polymer binder and particles per unit surface is within 10 to 17 g/m$^2$; and a distribution of the sizes of the polymer particles is not more than 3.5 μm in terms of standard deviation.

4 Claims, No Drawings

OPTICAL DIFFUSER

FIELD OF THE INVENTION

This invention relates to an optical diffuser, and particularly to an optical diffuser favorably employable for the preparation of a liquid crystal display, a projection screen, a transparent sheet for over-head projector, or a back-light sheet of an illuminating display.

BACKGROUND OF THE INVENTION

Optical diffusers are widely employed, for instance, for a liquid crystal display to diffuse light emitted by a back light or a screen of a television set or a cinematic projection. The optical diffuser is used to diffuse a light efficiently and also sufficiently transmit a light therethrough. Further, an optical diffuser to be used in a color imaging system should not be colored.

A conventionally employed optical diffuser to be used for a back light of a liquid crystal display comprises a transparent polyester support and an optical diffusing layer which is coated on a surface of the support and comprises inorganic particles (matting agents) and a binder. The optical diffuser of this type cannot transmit a light at a satisfactory level and is not suitably employed in combination with a color imaging system. One improvement comprises use of a polycarbonate sheet (which has a transparency higher than the polyester) which has been subjected to embossing treatment. The embossed polycarbonate sheet is at present used as a back light diffuser for liquid crystal display. The diffuser of embossed sheet, however, has a disadvantage that a sheet should have large thickness for allowing satisfactory embossing. Further, the embossed polycarbonate diffuser is liable to receive static electricity, and therefore an antistatic agent is necessarily sprayed on the diffuser when it is installed within a liquid crystal display. Furthermore, the embossed polycarbonate sheet is disadvantageous in its high cost such as two or three times as much as the cost of the conventional diffuser.

As an alternative solution, increase of amount of light may be effective to increase the light transmission through an optical diffuser. However, the increase of light amount needs increase of high electric power as well as production cost, which is naturally unfavorable.

Recently, Nikkei Microdevice (issued in February of 1993) reports an optical diffuser employing a combination of an organic polymer binder and organic polymer particles. The reported optical diffuser employs polymer particles of large sizes, and a weight ratio of the polymer particles to the binder is low. According to a study performed by the present inventors, the reported optical diffuser cannot show satisfactory light transmission, and the luminance given by a back light equipped with the reported optical diffuser is low.

SUMMARY OF THE INVENTION

The present invention has an object to provide an improved optical diffuser which shows a satisfactorily high light diffusing power (i.e., haze) and light transmission and further can be produced at a relatively low cost.

The present invention resides in an optical diffuser comprising a transparent support and an optical diffusing layer which is coated on one surface of the support and comprises an organic polymer binder and organic polymer particles, wherein a difference of refractive index between the polymer binder and polymer particles is not more than 0.05, the polymer particles have a weight average particle size of 10 to 21 µm, a weight ratio of the polymer particles to the polymer binder in the diffusing layer is within 1.9 to 2.6, a total weight of the coated polymer binder and particles per unit surface is within 10 to 17 g/m$^2$, and a distribution of the sizes of the polymer particles is not more than 3.5 µm in terms of standard deviation.

The transparent support of the optical diffuser according to the invention preferably has at least one ion conductive resin layer on its surface. The provision of the ion conductive resin layer on one or both surfaces of the support is effective to reduce reflection of light on its surface. Therefore, a back light on which an optical diffuser of the invention is arranged shows an increased luminance. The ion conductive resin layer can be formed, for instance, by coating an ion conductive resin (e.g., Julimer SP-50T, available from Nihon Junraku Co., Ltd. ) on the support and drying the coated layer. The ion conductive resin layer preferably has a thickness of 0.1 to 2.0 µm.

DETAILED DESCRIPTION OF THE INVENTION

In the optical diffuser of the invention, the support preferably has a high transparency and a high mechanical strength. There are no other specific limitations. The support generally is a plastic resin film having a thickness of 0.02 to 4.0 mm. A glass plate is also employable. Preferred examples of the plastic resin include polyester (e.g., polyethylene terephthalate), polyolefin (e.g., polyethylene or polypropylene), polyamide, polyether, polystyrene, polyesteramide, polycarbonate, polyphenylenesulfide, polyetherester, polyvinyl chloride and polymethacrylate.

The organic polymer binder of the diffusing layer preferably has a volume specific resistance of not lower than $10^{12}\Omega \cdot cm$. Examples of the organic polymer include vinyl acetate resin, ethylene-vinyl acetate copolymer, vinyl chloride resin, vinyl chloride-vinylidene chloride copolymer, acrylate resin, methacrylate resin, butyral resin, silicone resin, polyester resin, fluorinated vinylidene resin, nitrocellulose resin, styrene resin, styrene-acrylate copolymer, urethane resin, polyethylene resin, polypropylene resin, chlorinated polyethylene, and rosin derivatives. The polymer can be employed singly or in combination with each other as the binder.

The organic polymer particles to be incorporated into the diffusing layer has a weight average (mean) particle size of 10 to 21 µm, preferably 15 to 21 µm. If the polymer particles have a weight average particle size of smaller than 10 µm, the resulting diffuser gives a lower luminance. If the polymer particles have a weight average particle size of larger than 21 µm, the resulting diffuser also gives a lower luminance. The polymer particles should have an almost same refractive index as the polymer binder so that reflection on the interface between the particles and binder phase can be reduced. Practically, the difference of refractive index between the polymer binder and the polymer particles should be not larger than 0.05. For instance, polymer particles of polypropylene (refractive index: 1.48) or polymethyl methacrylate (PMMA, refractive index: 1.49) are preferably employed in combination with polymethyl methacrylate (refractive index: 1.49 ), methacrylic acid-acrylate copolymer (refractive index: 1.48–1.49), cellulose acetate (refractive index: 1.47), or polyvinyl butyral (refractive index: 1.485).

The weight ratio of the polymer particles to the polymer binder in the diffusing layer is also important to produce an optical diffuser which gives a high luminance. If the amount of polymer particles is so small as to give a ratio of less than 1.9, the desired high luminance cannot be provided, though the surface condition is good. If the amount of polymer particles is so large as to give a ratio of more than 3.6, the surface conditions become poor and no high luminance is given. Also important for producing an optical diffuser which gives a high luminance is the total amount of the polymer particles and polymer binder in the coated diffusing layer.

The optical diffuser should have a good light diffusing power. For instance, an optical diffuser for a liquid crystal display should have an appropriate optical diffusing power to hide dots of a light guiding plate., that is named a viewing nature or visibility. In order to improve the visibility, a matting agent comprising inorganic powders can be incorporated into the diffusing layer. The matting agent preferably comprise silica powder, calcium carbonate powder, alumina powder, or the like, which has a particle size of 1 to 5 μm.

As described above, the optical diffuser of the invention satisfies a variety of requirements. It is understood that such various requirements should be fulfilled because a favorable optical diffuser should have an appropriate and well balanced transparency, reflectivity and refractive index, particularly in the case that the optical diffuser is employed to receive a light of a specific incident angle of a narrow range.

The present invention is further described by the following examples.

In the examples, the polyethylene terephthalate (PET) support was previously subjected to glow discharge treatment on its both surfaces, so as to increase adhesion of the coated layer to the support. Each of the PET supports of Samples 1–22 and 24–28 was coated on both surfaces with an ion conductive resin solution of the under-mentioned composition, which was then dried at 130° C. for 1 minute to give an ion conductive resin layer of 0.4 μm thick (thickness of the dry layer). Thus processed support will be referred hereinafter to as "processed support".

| Ion Conductive Resin Solution | |
|---|---|
| Ion conductive resin (Julimer SP-50T, available from Nihon Junyaku Co., Ltd.) | 44.0 g |
| Methanol | 44.0 g |
| Cyclohexanone | 12.0 g |

(The ion conductive resin was prepared in the following manner: A composition of 25.4 weight parts of quaternarized dimethylaminoethyl methacrylate, 7.6 weight parts of 2-hydroxyethyl methacrylate, 46 weight parts of methyl methacrylate, and 21 weight parts of ethyl acrylate was copolymerized in an emulsion to give an aqueous solution of copolymer resin. The aqueous solution was mixed with 4 wt. % (per the polymer resin content) of glycerol polyglycidyl ether (cross-linking agent) and further mixed with 2.5 wt. % (per the polyglycidyl ether) of 2-methylimidazole to give an ion conductive resin solution of solid content of 20 wt.%.)

EXAMPLE 1

Diffuser Samples No. 1–6 and Reference

The processed support was coated on one surface thereof with the following coating mixture (for the preparation of an optical diffusing layer) using a wire bar coater, and air-dried at 130° C. for 1 minute to give an optical diffuser. The coating procedure was repeated with variation of wire diameter of the coater to coat a different amount of the coating mixture. Thus, diffuser samples No. 1 to 6 having a different solid content in the diffusing layer were prepared.

| Coating Mixture for Diffusing Layer | |
|---|---|
| Toluene | 61.7 g |
| Modified acrylate polymer (copolymer of methacrylic acid and acrylate, BR-79, available from Mitsubishi Rayon, Co., Ltd., refractive index: 1.49) | 12.1 g |
| Polymethyl methacrylate (PMMA) particles (Julimer MB20X, weight average particle size: 17.5 μm, standard deviation: 3.1 μm, refractive index: 1.49, available from Nihon Junyaku Co., Ltd.) | 26.2 g |

(The size (i.e., diameter) and its distribution of PMMA particles were measured by means of a Coulter Counter (multisizer) at a measurement concentration of 3%).

EXAMPLE 2

Diffuser Samples No. 7–12

Six kinds of PMMA (polymethyl methacrylate) particles having different weight average particle sizes were prepared by appropriately mixing two or more kinds of PMMA particles having different weight average particle sizes, selected from Mb1X, Mb10X, Mb20X and Mb30X, which were commercially available from Nihon Junyaku and had the following weight average particle sizes (D) and their standard deviations (σ):

Mb1X: D=7.9 μm, σ=1.6 μm
Mb10X: D=12.0 μm, σ=2.8 μm
Mb20X: D=17.1 μm, σ=1.6 μm
Mb30X: D=28.0 μm, σ=5.2 μm

Using the prepared six kinds of PMMA particles, six diffuser samples (Samples No. 7 to 12) were prepared under the condition that the total amount of the polymer binder and polymer particles was almost at the same level, namely, within 14.76 and 14.94 g/m².

EXAMPLE 3

Diffuser Samples No. 13–17

Five diffuser samples (Samples No. 13 to 17) were prepared using five kinds of PMMA particles which had the same weight average particle sizes but had different particle size distributions, namely, different standard deviations.

EXAMPLE 4

Diffuser Samples No. 18–26

Nine diffuser samples (Samples No. 18 to 26) were prepared using nine kinds of PMMA particles which had the same weight average particle sizes, same particle size distributions (namely, same standard deviations) and same total amounts of the diffusing layer-preparing mixture (polymer binder plus polymer particles), but had different weight ratios of polymer particle/polymer binder.

EXAMPLE 5

Diffuser Sample No. 27

On the PET support with no ion conductive resin coating was formed the same optical diffusing layer as that of Sample 4 of Example 1, to prepare Diffuser Sample No. 27.

EXAMPLE 6

Diffuser Sample No. 28

The procedure for the preparation of Diffuser Sample 12 of Example 2 was repeated using polystyrene particles (SGP-100, product of Soken Chemical Co., Ltd., refractive index: 1.54, weight average particle size: 29.1 μm, standard deviation (σ): 5.6 μm) in place of the PMMA particles. The polystyrene particles had a specific gravity of 1.06, while the PMMA particles had a specific gravity of 1.10. Therefore, the volume of the optical diffusing layer was adjusted by decreasing the amount of polystyrene particles by 4%. Further, since the polystyrene particles were liable to swell in contact with the solvent, the coating mixture was coated on the processed support just after the mixture was prepared.

[Evaluation]

Luminance and Visibility (Viewing nature) were evaluated on the above prepared optical diffuser samples (Samples No. 1 to 28) and the reference diffuser sample (Sample No. 29, commercially available optical diffuser) in the following manner.

(1) Luminance

A pair of optical diffusers were placed one on another on a light guiding plate in an arrangement that 10 each diffusing layer was placed opposite the light source side of the light guiding plate. The luminance was measured using a luminance meter (BM-7, available from Topcon Co., Ltd.).

As reference, a conventionally employed optical diffuser D-204 (commercially available product of Kimoto Co., Ltd.) was also measured on its luminance in the same manner. The diffuser D-204 gave a luminance of 960 cd/m$^2$. In view of this luminance value, it was decided that a diffuser showing a luminance sufficiently higher than 960 cd/m$^2$, that is, higher than 1,230 cd/m$^2$ (the value higher than 960 cd/m$^2$ by 270 cd/m$^2$, this value of difference giving a visually distinguishable difference) should be the desired diffuser. The luminance of the diffuser D-204 is set forth in Table 1 under Sample No. 29.

(2) Visibility

A pair of optical diffusers were placed on a light guiding plate (thickness: 4.0 mm) of an edge-light type in an arrangement of an ordinary liquid crystal display device, and the dot pattern of the guiding plate was visually checked to judge whether the dot pattern was distinguishable or not. An optical diffuser which gave a clearly distinguishable dot pattern was marked "AA". An optical diffuser which gave a barely distinguishable dot pattern was marked "BB". An optical diffuser which gave a undistinguishable dot pattern was marked "CC".

TABLE 1

| Sample No. | Particle Size (μm) | Standard Deviation (μm) | Particle /Binder | Total Amount (g/m$^2$) | Luminance (cd/m$^2$) | Visibility |
|---|---|---|---|---|---|---|
| 1 | 17.1 | 2.8 | 2.17 | 9.4 | 1,150 | CC |
| 2 | 17.1 | 2.8 | 2.17 | 10.0 | 1,232 | BB |
| 3 | 17.1 | 2.8 | 2.17 | 14.76 | 1,298 | AA |
| 4 | 17.1 | 2.8 | 2.17 | 16.5 | 1,270 | AA |
| 5 | 17.1 | 2.8 | 2.17 | 18.00 | 1,200 | AA |
| 6 | 17.1 | 2.8 | 2.17 | 20.32 | 1,170 | AA |
| 7 | 7.91 | 1.63 | 2.17 | 14.80 | 1,195 | AA |
| 8 | 12.05 | 2.10 | 2.17 | 14.91 | 1,230 | AA |
| 9 | 15.02 | 2.53 | 2.17 | 14.87 | 1,240 | AA |
| 10 | 20.9 | 2.90 | 2.17 | 14.83 | 1,250 | AA |
| 11 | 22.0 | 3.1 | 2.17 | 14.94 | 1,190 | AA |
| 12 | 30.2 | 5.2 | 2.17 | 14.78 | 1,170 | BB |
| 13 | 17.1 | 7.6 | 2.09 | 14.80 | 1,160 | AA |
| 14 | 17.1 | 5.0 | 2.05 | 14.97 | 1,180 | AA |
| 15 | 17.1 | 3.7 | 2.16 | 14.73 | 1,200 | AA |
| 16 | 17.1 | 3.5 | 2.14 | 14.67 | 1,234 | AA |
| 17 | 17.1 | 1.9 | 2.11 | 14.88 | 1,290 | AA |
| 18 | 17.1 | 2.8 | 1.20 | 14.56 | 1,088 | AA |
| 19 | 17.1 | 2.8 | 1.52 | 14.48 | 1,109 | AA |
| 20 | 17.1 | 2.8 | 1.77 | 14.90 | 1,140 | AA |
| 21 | 17.1 | 2.8 | 1.90 | 14.58 | 1,230 | AA |
| 22 | 17.1 | 2.8 | 2.39 | 14.74 | 1,270 | AA |
| 23 | 17.1 | 2.8 | 2.60 | 14.69 | 1,240 | AA |
| 24 | 17.1 | 2.8 | 3.26 | 14.59 | 1,238 | AA |
| 25 | 17.1 | 2.8 | 3.59 | 14.80 | 1,231 | AA |
| 26 | 17.1 | 2.8 | 3.81 | 14.66 | 1,210 | AA |
| 27 | 17.1 | 2.8 | 2.17 | 14.76 | 1,238 | AA |
| 28 | 29.1 | 5.2 | 2.30 | 14.20 | 1,130 | BB |
| 29 | — | — | — | — | 960 | AA |

Remarks:

"Particle size" means "Weight average particle size".

"Standard deviation" means "Standard deviation of the polymer particles".

"Particle/binder" means "Weight ratio of polymer particles/polymer binder".

"Total amount" means "Total amount of the coated polymer particles and polymer binder".

Comments on the results are given below.

(1) Diffuser Samples No. 1 to 6 increase their total amounts of the coated polymer binder and polymer particles in order. Diffuser Sample No. 1 gives poor luminance because the total amount of the coated polymer binder and polymer particles is too small, while Diffuser Samples No. 5 and 6 give poor luminance because the total amounts are too large.

(2) Diffuser Sample No. 7 gives poor luminance because the weight average particle size of the polymer particles is too small, while Diffuser Samples No. 11 and 12 poor luminance because the weight average particle sizes of the polymer particles are too large.

(3) Diffuser Samples No. 13, 14 and 15 are unsatisfactory because of their relatively low luminances. The low luminance is due to its large standard deviation of the polymer particles.

(4) Diffuser Samples No. 18, 19, 20 and 26 give poor luminance because the weight ratios of polymer particles to polymer binder are outside of the range of 1.9 to 3.6.

(5) Diffuser Sample No. 27 gives a satisfactory luminance, but the luminance is lower than Diffuser Sample No. 4 which has the same constituents except for arranging the ion conductive resin layer.

(6) Diffuser Sample No. 28 gives unsatisfactory luminance which is lower than Diffuser Sample No. 12 by approximately 3%. This is because the difference of refractive index between the polymer particles and the polymer binder in Diffuser Sample No. 28 is larger than 0.5.

I claim:

1. An optical diffuser comprising a transparent support and an optical diffusing layer which is coated on one surface of the support and which comprises an organic polymer binder and organic polymer particles, wherein a difference of refractive index between the polymer binder and polymer particles is not more than 0.05, the polymer particles have a weight average particle size of 10 to 21 μm, a weight ratio of the polymer particles to the polymer binder in the diffusing layer is within 1.9 to 2.6, a total weight of the coated polymer binder and particles per unit surface is within 10 to 17 g/m$^2$, and a distribution of the sizes of the polymer particles is not more than 3.5 µm in terms of standard deviation.

2. The optical diffuser of claim 1, wherein the transparent support has at least one ion conductive resin layer on its surface.

3. The optical diffuser of claim 1, wherein the polymer particles comprise at least one of polypropylene and polymethyl methacrylate, and the polymer binder comprise at least one of methacrylic acid-acrylate copolymer, polymethyl methacrylate, cellulose acetate and polyvinyl butyral.

4. The optical diffuser of claim 1, wherein the transparent support is made of polyethylene terephthalate.

* * * * *